United States Patent [19]
Boullart et al.

[11] 4,392,169
[45] Jul. 5, 1983

[54] MAGNETIC SHIELDING SPRING

[75] Inventors: Carolus J. Boullart; Adrianus C. H. J. Liefkens, both of Eindhoven, Netherlands

[73] Assignee: U.S. Philips Corporation, New York, N.Y.

[21] Appl. No.: 265,867

[22] Filed: May 21, 1981

Related U.S. Application Data

[63] Continuation of Ser. No. 80,360, Sep. 28, 1979, abandoned.

[30] Foreign Application Priority Data

Oct. 3, 1978 [NL] Netherlands .......................... 7809966

[51] Int. Cl.³ ............................................. G11B 15/60
[52] U.S. Cl. ................................................ 360/130.33
[58] Field of Search ........................... 360/130.33, 132; 428/900; 242/197–200; 226/198

[56] References Cited

U.S. PATENT DOCUMENTS

| 3,789,157 | 1/1974 | Greiner et al. | 360/132 X |
| 3,851,115 | 11/1974 | Zacaroli | 360/130.33 |
| 4,011,593 | 3/1977 | Gaiser et al. | 360/130.33 X |
| 4,072,992 | 2/1978 | Leshik | 360/132 X |
| 4,079,430 | 3/1978 | Fujishima et al. | 360/125 X |
| 4,126,287 | 11/1978 | Mendelsohn et al. | 148/31.55 |
| 4,191,984 | 3/1980 | Tsukidate et al. | 360/132 |
| 4,271,441 | 6/1981 | Greiner et al. | 360/130.33 |

FOREIGN PATENT DOCUMENTS 2633672 2/1978 Fed. Rep. of Germany .

OTHER PUBLICATIONS

Material Research Report by Allied Chemical, "New Ferrous Metglas . . . ", Nov. 1975.
Rapidly Quenched Materials, 2nd Int. Conf., Mit Press 1976, (Grant & Viessin Ed.), "Saturation Magnetostriction . . . ", by Arai et al., pp. 489–494.

Primary Examiner—John H. Wolff
Attorney, Agent, or Firm—David R. Treacy

[57] ABSTRACT

A magnetic tape cassette comprising a housing having an apertured wall to admit a magnetic head, tape guiding means, tape pressure means provided opposite to the aperture and a leaf spring adapted to press the tape pressure means against the tape when a magnetic tape is present in the cassette. The leaf spring consisting of one strip of a soft-magnetic metal alloy having an amorphous structure also serves as a magnetic shielding.

12 Claims, 4 Drawing Figures

MAGNETIC SHIELDING SPRING

This is a continuation of application Ser. No. 80,360, filed Sept. 28, 1979, now abandoned.

The invention relates to a magnetic tape cassette, in particular a compact cassette, comprising a housing having four circumferential walls, an aperture in one of the circumferential walls, to admit a magnetic head connected to a magnetic tape apparatus, tape guiding means, tape pressure means disposed opposite to the aperture, and a leaf spring adapted to press the tape pressure means against the tape when a magnetic tape is present in the cassette.

Such a magnetic tape cassette is disclosed in German Offenlegungsschrift No. 2633672 which describes a magnetic tape cassette having a resilient element consisting of a strip-shaped laminate formed by a layer of a resilient material (in this case beryllium-bronze), and a layer of a mechanically stress-free, soft magnetic material having a high permeability (in this case nickel-iron). A pad of flexible material (in this case felt) is secured to the center of the resilient element and serves as a tape pressure means.

The advantage of using such a laminated resilient element having a soft magnetic layer in a magnetic tape cassette is that in addition to a resilient function it fulfils a magnetic shielding or screening function, the screening effect being advantageous in that, during operation, the distance between the element and the magnetic head extending through the aperture and to be protected against interfering magnetic fields is much smaller than in magnetic tape cassettes of a more conventional type in which a magnetic screening plate is mounted separately behind the resilient element. Moreover, a laminated resilient element having a soft magnetic layer occupies little space and its assembly in a magnetic tape cassette is simple.

However, a disadvantage of a magnetic tape cassette having a laminated resilient element is that the manufacture of the resilient element is cumbersome and rather expensive and the desired spring characteristic is rather difficult to adjust. For example, first a thin plate of the resilient material must be obtained by rolling, on which plate a thin layer or a foil of the soft magnetic screen material is then provided.

SUMMARY OF THE INVENTION

It is an object of the invention to provide a magnetic tape cassette of the kind mentioned in the opening paragraph having a leaf spring which also serves as a magnetic shield and which can be manufactured in a simple and cheap manner and with which a desired spring characteristic can be realised.

The invention is characterized in that a leaf spring is used which consists of one single strip of a soft magnetic metal alloy having an amorphous structure.

It has been found that metal alloys of this type present magnetic and mechanical properties which make them very suitable for the application in question. Metals, both elements and alloys, are usually (poly) crystalline. This crystalline structure generally is the most stable state since this is the energetically most advantageous phase. An amorphous metal in which the atoms are arranged quite arbitrarily, however, is always in a metastable state. This disorderly arrangement is also present in the vapour and liquid phases of metals. Therefore, solid amorphous metals can be manufactured starting from one of these two aggregation states. By electro- or electroless deposition, for example, a suitable very fine-granular material can be obtained which is to be understood to mean herein a material having a grain size smaller than 500 Å.

Within the scope of the invention, electro-deposited (NiFe) strips which can be manufactured "in a desired thickness" notably on a substrate have proved to be very suitable. (The substrate was removed after the deposition). Also strips manufactured from a rapidly cooled magnetic alloy have proved to be very suitable although they can only be manufactured in restricted thicknesses only. These latter strips have the particular advantage that they can be manufactured directly from the melt in the required strip shape, for example, by spraying the melt on the rim of a rotating wheel (so-called melt spinning technique), whereby a ribbon is produced.

A metal alloy which can be obtained in an amorphous form formed by melt spinning and which is particularly suitable for a resilient element used in a magnetic tape cassette according to the invention is based on Fe with Co or Ni and comprises 10–30% of vitrifying agents for improved stability (vitrifying agents are to be understood to means herein one or more of the elements phosphorus, boron, carbon, silicon and aluminium). Such an amorphous alloy may have a composition

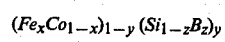
$(Fe_xCo_{1-x})_{1-y}(Si_{1-z}B_z)_y$ wherein $0.03 < x < 0.25$; $0.1 < y < 0.3$; $0.2 < z < 1$.

The composition with $x = 0.067$; $y = 0.25$; $z = 0.6$, hence

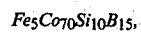
$Fe_5Co_{70}Si_{10}B_{15}$, has the advantage of having a magnetostriction which is zero or substantially zero. This is of importance because the soft magnetic properties of the resilient element should not vary under the resilient action.

Amorphous metal alloys are preferably formed by cooling a melt at a rate of approximately $10^5$ to $10^6$ degrees C. per second. So formed amorphous metal alloys are usually amorphous at least for 50%, which can be determined by X-ray diffraction. These alloys are suitable for the application in question. However, it is desirable that the amorphous alloys be amorphous for at least 80%, preferably at least 95%, to achieve an optimum performance in a magnetic tape cassette according to the invention.

In a characterizing manner the alloys will be given the shape of a ribbon from which leaf spring-screening elements for magnetic tape cassettes are manufactured. The ribbon is manufactured in a suitable manner by pouring molten material directly on a cooling surface or into a suitable cooling medium. Such a processing method reduces the cost of manufacture considerably since no separate ribbon shaping process is necessary.

The processibility and ductility of the amorphous metal alloys are good. When the known technique is used with non-amorphous alloys, mechanical processing, such as punching or stamping, has the tendency of impairing the magnetic properties. The resulting deterioration in magnetic properties has to be overcome by a complementary thermal treatment. In the amorphous metal alloys used according to the invention the magnetic properties do not detoriate and in fact slightly improve in many cases in such a process.

Soft magnetic materials in a magnetically optimally annealed condition generally have a comparatively low yield point and are hence useless for application as a "leaf spring". Amorphous metals combine a high yield point with good soft magnetic properties; a maximum permeability $\mu_{max}$ of $7 \times 10^5$ can be obtained, for example, by magnetic field cooling.

The invention also relates to a leaf spring for use in magnetic tape cassettes, which element is characterized in that it consists of one strip of a soft magnetic metal alloy having an amorphous structure.

According to a further aspect of the invention the material of the leaf spring is electroplated Ni-Fe, and according to still a further aspect it is an alloy of Fe with Co or Ni and containing 10-30% by weight of vitrifying agents, and made by quenching from the melt, for example having a composition

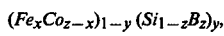

$(Fe_xCo_{z-x})_{1-y}(Si_{1-z}B_2)_y$, with $0.03 < x < 0.25$  $0.1 < y < 0.3$; $0.2 < z < 1$.

An embodiment of the invention will now be described in greater detail, by way of example, with reference to the drawing.

DESCRIPTION OF THE PREFERRED EMBODIMENTS

Figure 1:
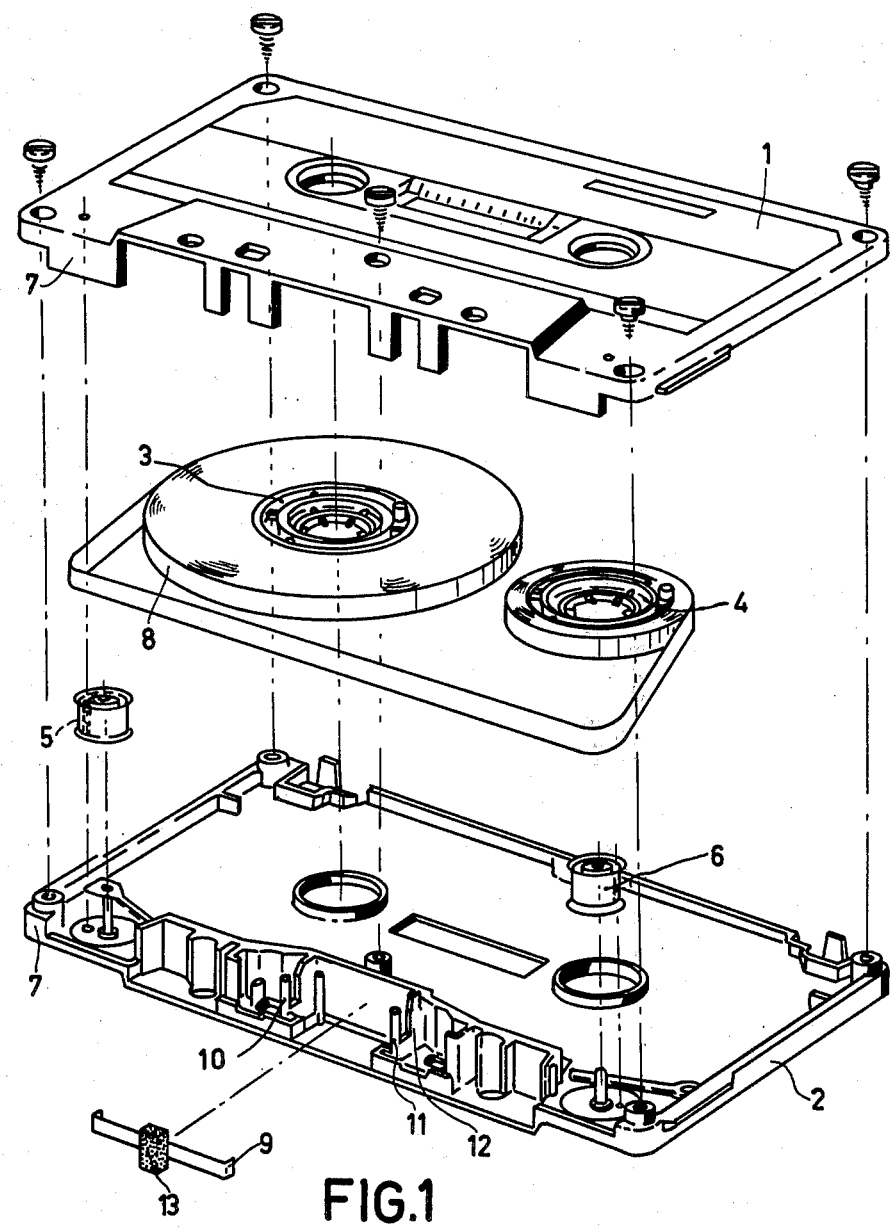
FIG. 1 is an exploded view of a magnetic tape cassette having a resilient magnetic screening element.
Figure 2:
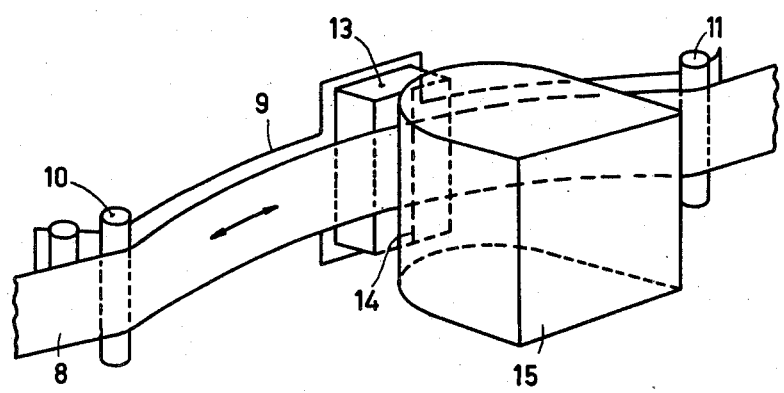
FIG. 2 shows the resilient magnetic screening element of FIG. 1 during operation in which it presses a magnetic tape against a magnetic head via a pressure felt, the components being shown on a larger scale than in FIG. 1.

A magnetic tape cassette generally comprises two housing halves 1 and 2 and two winding reels 3, 4 for winding a magnetic tape 8 which is transported between two rollers 5, 6 having rotational axes parallel to the front side 7 of the cassette (FIG. 1). A number of apertures are provided in the front side through which, when the cassette is placed in a tape recording and/or playback apparatus, a recording/playback head, an erasing head and a pressure roller project. The half 1 of the housing furthermore comprises also have apertures to introduce the capstan and reference holes for positioning the cassette. Tape guiding means 10 and 11 together with a wall 12 present at a small distance behind it serve to receive a leaf spring 9 with shielding or screening properties having a tape pressure means in the form of a felt pad 13. The leaf spring 9 is of a soft-magnetic amorphous material and combines suitable mechanical properties, by which a desired pressure force can be realised, with suitable magnetic screening properties. Due to the shape and disposition of the element 9, it can optimally adapt to the shape of the tape contact surface 14 of any magnetic head 15 inserted into the cassette. The element 9 adjoins the screening present in the recording-playback apparatus which screens the head against stray fields. This is shown in FIG. 2 in detail in which the same reference numerals are used for the same components as in FIG. 1. The tape 8 is pressed, for example, against the head 15 by a force of 0.1 N to 0.2 N. The leaf spring 9 has a widened portion in the center so as to match the shape of the head 15 (and hence for better screening).

Figure 3:
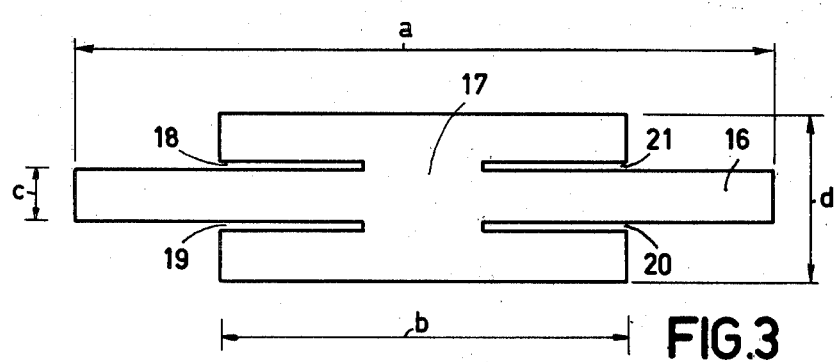
FIG. 3 is a plan view of another resilient magnetic screening element.

FIG. 3 shows a leaf spring which is even more effective as regards screening properties. This element 16 has a central portion 17 is wider than element 9 and for good resilient properties it is provided with two sets of longitudinal slots 18, 19 and 20, 21, respectively.

In tape material which is given a certain thickness by rolling, the price of the material is determined to a considerable extent by the rolling costs. Hence the thinner the material, the higher the price/kg.

This rule does not apply to amorphous metals because the production technique differs totally from the normal production methods for tape material.

A method of making an amorphous metal body suitable for a resilient magnetic screening element for use in a magnetic tape cassette according to the invention is by electric deposition or electroless deposition. An amorphous deposit may be obtained from an aqueous solution containing metal ions by a correct choice of the process parameters. A suitable electro-deposition bath is, for example, a nickel-iron bath commercially available as "Udylite's Niron". As a substrate may serve, for example, a brass plate having 25% of sulphamate nickel. This plate is first passivated by treating it successively with hot water and a solution containing 25 g/l of potassium dichromate. After depositing a layer of the desired thickness on the substrate, the layer is separated from the substrate (the grain size of the material is between 150 and 200 Å.).

The most frequently used methods of making an amorphous metal start from the liquid phase. The following method has proved very suitable for the purpose of the invention. This method is termed a "melt spinning technique" and is characterized in that a thin jet of a molten alloy is sprayed onto the rim of a rotating wheel.

A metal sample of a few grams is melted inductively in a quartz tube. The outflow aperture in the bottom of the tube has a diameter of approximately 0.4 mm and is disposed at approximately 1 mm from the rim of the wheel. The outflowing liquid metal impinges the rim at an angle of 14°. The wheel is made from a readily heat conducting material, preferably copper, and has been polished so as to provide a good thermal contact. The diameter of the wheel is 760 mm and the wheel is rotated at 1000 r.p.m. This means that the ribbon formed which may have, for example, a width which is between 2 and 10 mm, leaves the wheel at a speed of 40 m/sec. A slight argon excess pressure ($\approx 0.5$ at) is necessary to cause the liquid metal to leave the quartz tube.

Figure 4:
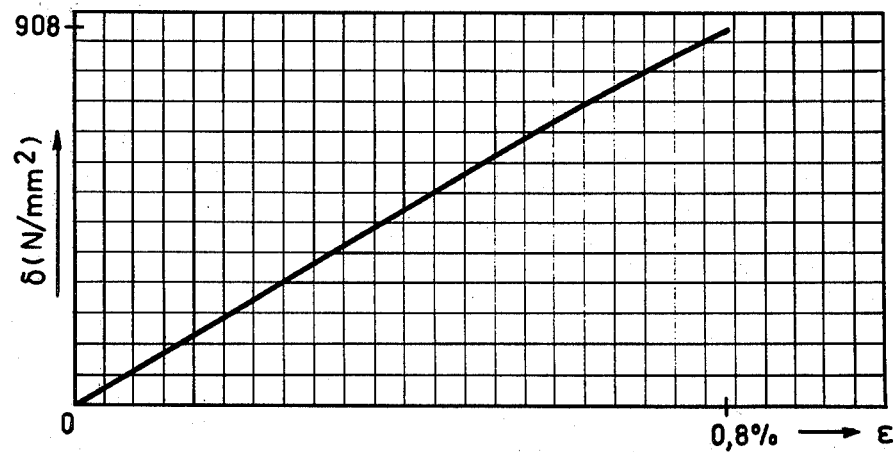
FIG. 4 shows a stress-strain characteristic of the resilient magnetic screening element shown in FIGS. 1 and 2.

A soft magnetic alloy which is suitable for the purpose of the invention and which can be manufactured in the above-described manner is $Fe_5Co_{70}Si_{10}B_{15}$. The static magnetic properties and the mechanical properties of this material in ribbon form and of electroplated $Ni_{80}Fe_{20}$ have been measured and are shown in Table 1. The resilient properties of the elements formed from these materials were very satisfactory. As shown in the stress-strain curve (FIG. 4), for example, a leaf spring of amorphous $Fe_5Co_{70}Si_{10}B_{15}$ has a high yield point and substantially no strain.

TABLE 1

| Material | thickness mm | Mechanical properties | | | | Magnetic properties | | | |
|---|---|---|---|---|---|---|---|---|---|
| | | E-modulus KN/mm$^2$ | strain limit N/mm$^2$ acc. to DIN 50145 | stress strength N/mm$^2$ | hardness H$_V$ | H$_c$ A/cm | $\mu_i$ × 10$^3$ | $\mu_{max}$ × 10$^3$ | Bs Tesla |
| Fe$_5$Co$_{70}$Si$_{10}$B$_{15}$ | 0.042 | 109.4 | 820 | 908 | 910 | 0.008 | 7 | 700 | — |
| Ni$_{80}$Fe$_{20}$ | 0.050 | 169 | 1380 | 1910 | 750 | 0.050 | 10 | 70 | 1.2 |

TABLE 2

| Material | thickness mm | dimensions of screening element in mm | | | | Thermal treatment | Screening in dB | |
|---|---|---|---|---|---|---|---|---|
| | | a | b | c | d | | L channel | R channel |
| Fe$_5$Co$_{70}$Si$_{10}$B$_{15}$ | 0.042 | 19.2 | | | 5.0 | — | 6.8–8.2 | 10.8–12.6 |
| | 0.042 | 19.2 | | | 6.5 | — | 7.9 | 11.4 |
| | 0.042 | 19.2 | 6.5 | 3.5 | 6.5 | — | 10.0 | 12.2 |
| Ni$_{80}$Fe$_{20}$ | 0.050 | 19.2 | | | 5.0 | — | | |

Within the scope of the invention, the shape and dimensions of the resilient element (FIG. 3) which are very important for shielding function and rigidity, have been varied on a restricted scale (see table 2).

The reason that sufficient screening values can be achieved with a comparatively thin resilient element is that the distance to the head to be shielded is very small and that the shape of the screening is matched to the shape of the head so that the shielding effect is very efficient.

Measuring method to determine the shielding values

In order to determine the shielding values of various resilient elements, a pressure felt was bonded to a resilient element and this assembly was placed in an unrecorded cassette half. The cassette half was placed in a shielding measuring apparatus for cassettes. This apparatus makes it possible to determine the shielding properties by means of a magnetic head against which the cassette half is pressed in the same manner as in a cassette recorder. For this purpose, the combination of magnetic head-cassette half is exposed to a magnetic interference field having a field strength of 50 A/m and the starting signal of the magnetic head is measured with (V$_1$) and without a shielding element (V$_2$). The screening factor is expressed in dB. (20 log V$_1$/V$_2$=screening factor). The results are recorded in table 2.

What is claimed is:

1. A magnetic tape cassette comprising a housing having circumferential walls, one of said walls having an aperture for admitting a magnetic head connected to a magnetic tape apparatus, tape guiding means for guiding a magnetic tape present in the cassette past said aperture, tape pressure means disposed opposite said aperture, a leaf spring arranged to press the tape pressure means against the tape when a magnetic tape is present in the cassette, and means for magnetically shielding a region in the cassette adjacent said pressure means, characterized in that the leaf spring and the means for magnetically shielding together consist of a unitary element which is a strip of soft magnetic metal alloy having an amorphous structure.

2. A magnetic tape cassette as claimed in claim 1, characterized in that said strip is at least 80% amorphous.

3. A magnetic tape cassette as claimed in claim 1, characterized in that said strip is at least 95% amorphous.

4. A magnetic tape cassette as claimed in claim 1, 2 or 3 characterized in that the metal alloy has a composition based on iron together with cobalt or nickel and contains from 10–30% by weight of vitrifying agents.

5. A magnetic tape cassette as claimed in claim 4, characterized in that the leaf spring is a strip of nickel iron alloy produced by electro-deposition.

6. A magnetic tape cassette as claimed in claim 1, 2 or 3 characterized in that the leaf spring has soft magnetic properties which do not vary under resilient movement.

7. A magnetic tape cassette comprising a housing having circumferential walls, one of said walls having an aperture for admitting a magnetic head connected to a magnetic tape apparatus, tape guiding means for guiding a magnetic tape present in the cassette past said aperture, and tape pressure and shielding means disposed opposite said aperture, said tape pressure and magnetic shielding means comprising a leaf spring, characterized in that the leaf spring provides the shielding function of the tape pressure and shielding means, and that the spring is a unitary element which consists of a strip of soft magnetic metal alloy having an amorphous structure and a composition defined by the formula:

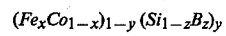

wherein
0.03 < x < 0.25; 0.1 < y < 0.3; 0.2 < z < 1.

8. A leaf spring for providing a biasing force and magnetic shielding, suitable for use in a magnetic tape cassette, consisting of one unitary strip of a soft magnetic metal alloy having an at least 80% amorphous structure.

9. A leaf spring as claimed in claim 8, characterized in that the strip has an at least 95% amorphous structure.

10. A leaf spring as claimed in claim 8 or 9, characterized in that the strip consists of an electroplated nickel iron alloy.

11. A leaf spring as claimed in claim 8 or 9, characterized in that the alloy has soft magnetic properties which do not vary under resilient movement, said alloy having a composition based on iron together with cobalt or nickel and containing from 10 to 30% by weight of vitrifying agents.

12. A leaf spring suitable for use as a combined spring and shield in a magnetic tape cassette, characterized in that the spring consists of one unitary strip of a soft magnetic metal alloy having an amorphous structure and a composition defined by the formula:

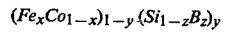

wherein
0.03 < x < 0.25; 0.1 < y < 0.3; 0.2 < z < 1.

* * * * *